United States Patent [19]

Knappe et al.

[11] 3,798,990
[45] Mar. 26, 1974

[54] MOTOR DRIVE
[75] Inventors: Wolfram Knappe, Kitzingen; Adolf Lindner, Gerbrunn, both of Germany
[73] Assignee: Siemens Aktiengesellschaft, Munich, Germany
[22] Filed: Oct. 26, 1972
[21] Appl. No.: 301,160

[30] Foreign Application Priority Data
Aug. 25, 1972 Germany............................ 2241794

[52] U.S. Cl..................................... 74/411, 64/30 C
[51] Int. Cl........................... F16h 57/00, F16h 1/16
[58] Field of Search.............. 74/412 TA, 411, 42 S; 64/30 R, 30 C

[56] References Cited
UNITED STATES PATENTS
1,447,390   3/1913   Kucharski............................ 74/411
1,734,813   11/1929  Knowles............................... 74/411
1,959,042   5/1934   Staley................................... 64/30 C
2,144,322   1/1939   Benson................................. 74/411
3,585,817   6/1971   McCafferty, Jr. et al............ 64/30 C

*Primary Examiner*—Leonard H. Gerin
*Attorney, Agent, or Firm*—Kenyon & Kenyon Reilly Carr & Chapin

[57] ABSTRACT

A motor drive includes a gear box having front and back portions and a countershaft journaled inside of the box for transmitting rotative power from a rotative input shaft to a rotative output shaft. The drive from the input shaft to the countershaft is via a slip clutch requiring manual adjustment and located near the rear portion where it is relatively inaccessible without first removing various parts. The front end of the countershaft projects through the front portion of the box where it is accessible, and to give access to the slip clutch to permit its adjustment, this shaft is formed with a bore or passageway so that a long tool can be passed through it to the slip clutch to adjust the latter.

5 Claims, 2 Drawing Figures

PATENTED MAR 26 1974          3,798,990

MOTOR DRIVE

BACKGROUND OF THE INVENTION

Certain applications require a motor drive that is very compact, an example being a motor drive used to drive the switching mechanism in an electrically driven vehicle. In this and other instances the drive may incorporate some means which releases the torque transmitted through the drive when this torque exceeds a value that might damage either the driven mechanism or the driving motor. For example, an adjustable slip clutch is indicated.

A motor drive for such an application, in a compact arrangement, includes a gear box to which an electric motor is attached with its drive shaft extending into the gear box, gearing in the gear box providing for an adequate rotative speed reduction of the output shaft. Because of the demand for compactness the torque release mechanism, such as a slip clutch, is located very close to the rear portion of the gear box where the driving motor is connected. Sometimes the gear box must provide a total enclosure for safety reasons.

Because of manufacturing problems involved by such a motor drive, once the motor is attached to the gear box and the unit is ready for installation, it is usually necessary to adjust the torque release mechanism to obtain the exact torque release value desired. Also, adjustment may be necessary after installation.

DESCRIPTION OF THE PRIOR ART

The prior art way for adjusting the torque release mechanism in such instances has been to uncouple the motor from the gear box and more or less disassemble the gear box to provide access to the adjustable parts. The side wall of the box may be provided with a window or other opening covered by a removable cover which must be removed to give access to the parts. Incidentally, it is to be understood that the mechanism, such as a slip clutch, is manually adjusted when necessary to provide the release at the torque desired. It is not a remotely controllable device.

SUMMARY OF THE INVENTION

The object of the present invention is to provide in a gear box of the described type some way to manually adjust the torque release mechanism, or slip clutch, without uncoupling and removing the motor or disassembling the box or any of its associated parts.

The motor drive of this invention comprises the box having its front and back portions, and a rotative shaft journaled inside of the box and having a front end accessible through this front portion and a back end remote from this portion. The design is such that this shaft can be a countershaft carrying the drive from an input shaft extending in through the box's back portion and delivering power to an output shaft after a large gear reduction is effected. The input shaft is arranged parallel and offset from the countershaft with a spur gear drive between these parts, the countershaft carrying a gear worm in mesh with a worm wheel keyed to a right angularly arranged output shaft. To keep the torque release mechanism, hereinafter referred to specifically as a slip clutch, on the side of this gear worm and wheel reduction train where the clutch can be most effective, the slip clutch is located adjacent to the back portion of the gear box near where the input shaft enters. Consequently the slip clutch is relatively inaccessible, particularly if the drive motor is directly attached to the back portion of the gear box with its shaft extended through the latter.

With the above understanding the hereinabove stated object is attained by forming the countershaft with an axially extending passage or bore. This passage extends clear through the countershaft from the front exposed end to its back end where the slip clutch is located. At the back end of this passage the slip clutch is designed to provide a manually actuated operator for its adjustment and which is exposed at the back end of the passage. With this arrangement a tool having a long shaft may be inserted through the passage from the front of the gear box, the tool extending to the clutch adjustment operator and being adapted to engage and work the latter as required to provide the desired adjustment of the torque value required.

More particularly the slip clutch operator comprises a screw releasably engageable by the tool and which is threaded through the back end of the countershaft's passageway so that with a rotative action the screw may be screwed axially in either direction. This screw is provided with a radially extending portion, such as a flange or annular shoulder, which engages an axially slidable sleeve encircling the back end of the countershaft and engaged by the flange or shoulder, and extending inwardly to the slip clutch. With the slip clutch elements biased towards this sleeve by an elastic compression element, by rotation of the screw the sleeve may transmit force to the slip clutch to vary, by compression of this element, the clutch action as required.

Since the tool may be removed from the front end of the countershaft having the passageway, unauthorized tampering with the adjustment is made improbable. With the motor attached to the gear box and the latter completely assembled and in its closed condition, the desired adjustment may be made either at the shop where the motor drive is assembled, or, if necessary, when the assembly is installed to drive an electric switching system in the case of an electrically driven vehicle, or other relatively heavy equipment.

DESCRIPTION OF THE DRAWINGS

A preferred embodiment of the present invention is illustrated by the accompanying drawings in which.

DESCRIPTION OF THE PREFERRED EMBODIMENTS

Figure 1:
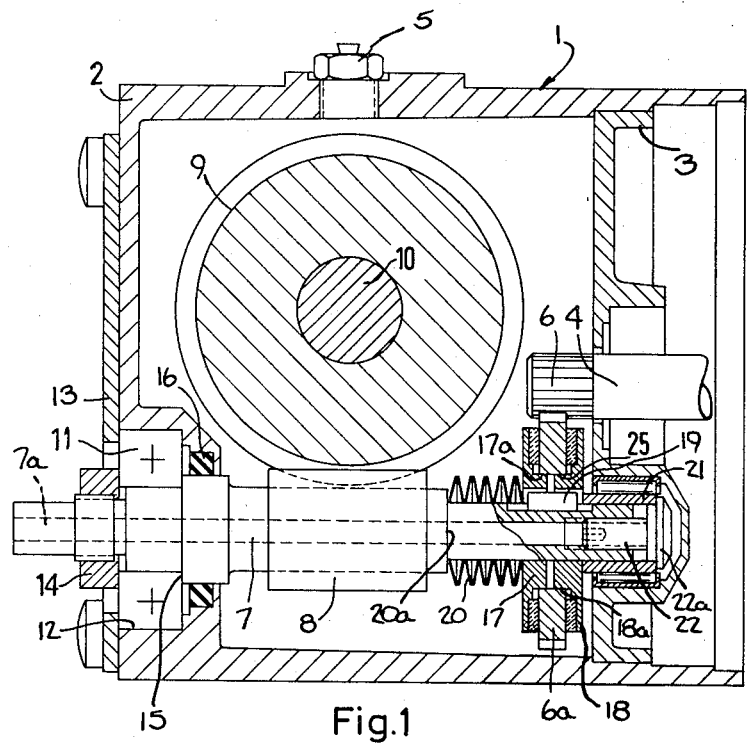
FIG. 1 is a longitudinal vertical section of a gear box embodying the new drive.

Having reference to the above drawings, the gear box 1 has a front wall or portion 2 and a back wall or portion 3. An electric motor of which only its shaft 4 is shown is attached to and closes the back portion of the gear box 1, its shaft 4 projecting into the gear box through a suitable opening with the construction being such that the interior of the gear box is sealed fluid tightly, the box having a pressure relief valve 5 in case of an excessive pressure in its inside.

The interior end of the drive shaft 4, representing the input to the gear box, is formed as a pinion with axially long teeth 6 and an annular gear wheel 6a is in mesh with this pinion. These are spur gears permitting axially sliding motion of the gear wheel 6a relative to the pinion 6.

It is this spur gearing, which effects some gear reduction, which drives the countershaft 7 which extends from the front to the back end of the gear box 1 and has keyed to it the worm gear 8 which meshes with the worm gear wheel 9 which is keyed to the output shaft 10 connecting with, for example, the electric switching equipment. The output shaft is right angularly with respect to the input shaft 4 and the countershaft 7. The worm gear thrust is taken by a thrust bearing 11 seated in a recess 12 in the front end of the box 1 and providing a back retaining shoulder for the bearing, a front retaining shoulder being provided by a removable front plate 13. A nut 14 retains the bearing 11 against a countershaft shoulder 15, so thrust is resisted in either direction. To provide sealing for the box 1, a seal 16 is provided between the countershaft shoulder 15 and the wall of the recess 12.

This kind of construction makes it most practical to locate the slip clutch between the ring gear 6a and the countershaft 7. A slip clutch normally requires manual adjustment to make certain that it releases at the desired torque value and yet this location makes the slip clutch relatively inaccessible without dismantling the motor connected to the back end 3 of the enclosure, and usually requiring a lateral side opening for the box 1 or some other arrangement to permit lateral access to the clutch, all of which is undesirable In this instance the slip clutch consists of axially opposed clutch disks 17 and 18 engaging the opposite flat sides of the gear wheel 6a, these disks forming shoulders 17a and 18a on which the ring gear 6a rides for free rotation, the rotative drive being via the friction faces of the clutch disks 17 and 18 engaging the flat sides of the wheel gear. Both clutch disks are connected to the countershaft 1 in an axially slidable manner by a key 19 which locks the parts together rotatively. A compression spring 20 pushes the disk 17 backwardly against that side of the gear wheel 6a, the long toothed spur gear pinion 6 permitting axial motion of the gear wheel 6a, while the clutch disk 18 is held against movement in the same direction by a sleeve 21 which encircles the back end of the countershaft 7 in an axially slidable manner, the front end of this sleeve butting against the clutch plate 18. It follows that movement of the two disks towards the spring 20 compresses the latter, the clutch disks then increasing their frictional engagement with the flat sides of the gear wheel 6a, opposite motion of the sleeve producing the opposite effect. It can be seen that the sleeve 21 is at the back end of the enclosure 1 and that insofar as concerns its manual adjustment, dismantling of the motor drive to a substantial extent would ordinarily be required.

In accordance with the present invention, the countershaft 7 is formed with an axially extending bore or passage 7a which is open at the exposed or front end of the shaft 7, and which extends through to the shaft's back end on which the sleeve 21 slides. The shaft's front end projects through the bearing 11 and an opening in the plate 13 and is therefore fully exposed at the front portion 2 of the gear box 1. The bore 7a extends completely through the shaft 7 and is open at the shaft's back end.

This back end of the bore 7a is internally threaded and a screw 22 is screwed into this end, this screw having a laterally extending part, shoulder or flange 22a which rotatively engages the adjacent end of the axially slidable sleeve 21. Thus this screw 22 operates as a manually adjustable operator exposed to the inside of the bore or passageway 7a at the back end of the countershaft 7 and thus being accessible through or by way of this bore from the front end of the countershaft 7 which is exposed at the front portion of the gear box and is at an easily accessible location.

It follows from the above that by the insertion by a tool of suitable length through the bore 7a from the countershaft's front end, the screw 22 may be rotated so as to screw it in and out relative to that end of the countershaft, with the axially slidable sleeve 21 functioning as a thrust member against the clutch plate 18, and against the elastic reaction of the compression spring 20 working against the clutch plate 17.

Figure 2:
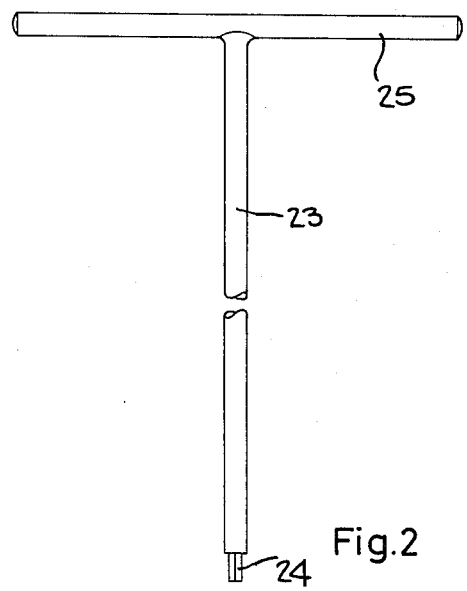
FIG. 2 is an elevation view of the tool used to effect the adjustment.

As illustrated, the front end of the screw 22 is provided with a recess of rectangular cross section, FIG. 2 illustrating a tool having a shank 23 long enough to reach from the countershaft's front end back to the screw 22, the working end of this tool being shaped at 24 to fit the recess in the screw and the tool having a cross bar handle 25.

The compression spring 20 has a stationary end anchored by a countershaft shoulder 20a, the reaction to its spring force being provided by the axially sliding sleeve 21 held by the shoulder or flange 22a of the screw 22, so the elastic reaction of this spring which depends on the adjustment of the screw 22 is not affected by any end play in the countershaft 7, the ring gear 6a being capable of axial sliding motion on the long toothed pinion 6 of the input shaft 4 which may, of course, be the shaft of the electric motor fastened to the back portion of the enclosure 1. However, possible end play of the countershaft 7 due to the worm gear thrust in the axial direction of this shaft, is resisted by the thrust bearing 11. Although this thrust bearing and the front end of the countershaft are accessible from the front portion 2 of the enclosure 1, this accessibility alone cannot be used to adjust the slip clutch release moment or torque for obvious practical reasons. The inaccessibility of the slip clutch which previously presented a problem is overcome by the described features of the present invention.

Although fairly obvious, it should be mentioned that the end 24 of the tool with the long shank 23 may be freely removed after use from the recess in the screw 22. If the tool is kept from unauthorized use, the adjusted slip clutch cannot be tampered with. The screw and tool may have their mutually mating portions shaped in any way preventing relative rotation between them.

What is claimed is:

1. A motor drive comprising a gear box having front and back portions, a rotative shaft journaled inside of said box and having a front end accessible through said front portion and a back end remote from this front portion, and adjustable means at said back and requiring manual adjustment; wherein the improvement comprises said shaft having an axial passage opening from the shaft's said front end and extending to its said back end, said means having an adjustment operator exposed to said passage at said back end, and operating means extending through said passage and having a rear end operatively connected to said operator and having an operable forward end manually accessible from the outside of the box's said front portion.

2. The drive of claim 1 in which said operating means is removable from said passage, its said rear end being releasable from said operator.

3. The drive of claim 1 in which said shaft is a countershaft, said box having a rotative input power shaft extending into it from its said back portion, and gearing interconnecting this input shaft with this countershaft through said adjustable means, the latter being an adjustable torque releasable clutch.

4. The drive of claim 3 in which said clutch is adjusted by an axially movable annular member encircling the shaft's said back end, said operator comprising a rotative screw threaded in said passage at said back end and therebeyond having a radially extending portion engaging said member, said operating means rotatively engaging said screw.

5. The drive of claim 4 in which said operating means is removable with a shaped working end, said screw having a forward end shaped for releasable engagement with said working end.

* * * * *

UNITED STATES PATENT OFFICE
CERTIFICATE OF CORRECTION

Patent No. 3,798,990      Dated March 26, 1974

Inventor(s) Wolfram Knappe, Adolf Lindner

It is certified that error appears in the above-identified patent and that said Letters Patent are hereby corrected as shown below:

In the Foreign Application Priority Data change the file number of the German application upon which the claim for priority is based from "2241794" to --P 22 41 794.3--

Signed and sealed this 24th day of September 1974.

(SEAL)
Attest:

McCOY M. GIBSON JR.
Attesting Officer

C. MARSHALL DANN
Commissioner of Patents